United States Patent [19]

Kwasniewski et al.

[11] Patent Number: 5,769,600
[45] Date of Patent: Jun. 23, 1998

[54] BULK HANDLING APPARATUS

[75] Inventors: Richard E. Kwasniewski, Fountain Valley; Jose Salinas, Jr., Irvine; Philip Medina, Woodcrest; Edward McLaughlin, Santa Ana; Randall Wienke, South Pasadena; Vernon Bundy, Orange; Klaus Kurz, Monterey Park; Lawrence Fosler, Perris; Gary Fain, Irvine, all of Calif.

[73] Assignee: Los Angeles Times, a division of The Times Mirror Company, Los Angeles, Calif.

[21] Appl. No.: 650,918

[22] Filed: May 17, 1996

[51] Int. Cl.$^6$ ................................................. B65G 57/11
[52] U.S. Cl. ................... 414/794.3; 414/786; 414/792.6; 414/907
[58] Field of Search .......................... 414/792.6, 794.3, 414/788.2, 788.3, 791.2, 791.3, 796.7, 786, 608, 907; 198/418.5; 206/499; 220/625

[56] References Cited

U.S. PATENT DOCUMENTS

| | | | |
|---|---|---|---|
| 1,266,737 | 5/1918 | Wood et al. | 414/788.3 |
| 2,699,264 | 1/1955 | Bruce et al. | |
| 2,921,508 | 1/1960 | Schneider et al. | |
| 3,568,578 | 3/1971 | Fujishiro | 414/788.3 |
| 3,570,209 | 3/1971 | Salwasser | |
| 3,667,628 | 6/1972 | Gabler et al. | |
| 3,902,609 | 9/1975 | Ohlsson | |
| 3,918,598 | 11/1975 | VanderMeer et al. | |
| 4,162,016 | 7/1979 | Schmitt | |
| 4,195,959 | 4/1980 | Schmitt | 414/794.3 X |
| 4,239,432 | 12/1980 | Richardson | 414/792.6 X |
| 4,302,140 | 11/1981 | Donnelly et al. | |
| 4,307,800 | 12/1981 | Joa | 414/788.3 |

(List continued on next page.)

FOREIGN PATENT DOCUMENTS

| | | |
|---|---|---|
| 0066554 | 12/1982 | European Pat. Off. |
| 557824 | 9/1993 | European Pat. Off. |
| 2404514 | 8/1975 | Germany |
| 2929780 | 2/1980 | Germany |
| 3107495 | 11/1982 | Germany |
| 3524959 | 1/1986 | Germany |
| 56-82737 | 7/1981 | Japan |
| 100024 | 6/1983 | Japan ..................................... 414/907 |
| 4-16423 | 1/1992 | Japan .................................. 414/791.6 |
| 8801528 | 1/1990 | Netherlands |
| 184848 | 9/1956 | Sweden |
| 671566 | 9/1989 | Switzerland ........................... 414/907 |
| 1052446 | 11/1983 | U.S.S.R. |
| 2082548 | 3/1982 | United Kingdom |

*Primary Examiner*—Janice L. Krizek
*Attorney, Agent, or Firm*—Irell & Manella LLP

[57] ABSTRACT

A method and apparatus for stacking newspapers is disclosed which obviates the need to fasten individual stacks. Once ejected from a stacking device, stacks of newspapers pass through an assembly station where they are arranged into groups of three, called slugs, and compressed. The slug then enters a collector where a layer consisting of four slugs is positioned on a sliding table. This positioning requires lateral movement of slugs. Lateral support is provided throughout this movement to prevent the stacks from toppling over. Once a full layer has been accumulated, the sliding table is retracted, and the layer of newspapers falls onto a floating table below. This floating table, which serves as the bottom floor of the container in which it is housed, is automatically lowered by discrete amounts as layers are received. Extendible cylinders located below the collector vertically move the floating table. Since the four walls of the container provide the requisite lateral support, layers of unfastened stacks are able to be securely deposited on the floating table. Once the full container is removed from the collector, a fork lift raises the floating table by inserting its prongs into a gap created between the floating table and the open bottom of the container. In another aspect of the invention, bottom copy damage associated with lateral movement of newspapers is reduced by positioning the stacks so that the nose of the bottom group of newspapers in each stack points in the ultimate direction of lateral movement.

9 Claims, 9 Drawing Sheets

U.S. PATENT DOCUMENTS

| | | | |
|---|---|---|---|
| 4,439,084 | 3/1984 | Werkheiser | 414/792.6 X |
| 4,540,325 | 9/1985 | Heisler . | |
| 4,582,463 | 4/1986 | Schreiner | 414/796.7 |
| 4,589,812 | 5/1986 | Meives et al. . | |
| 4,704,060 | 11/1987 | Winski et al. | 414/792.6 |
| 4,708,564 | 11/1987 | Mylrea et al. . | |
| 4,714,152 | 12/1987 | Ross | 198/418.5 X |
| 4,725,180 | 2/1988 | Kasamatsu et al. . | |
| 4,741,414 | 5/1988 | Claasen | 414/608 |
| 4,902,184 | 2/1990 | Fritz | 414/790.3 |
| 5,002,458 | 3/1991 | Moltrasio | 414/792.1 |
| 5,143,510 | 9/1992 | Takamura et al. | 414/796.7 |
| 5,203,671 | 4/1993 | Cawley et al. | 414/791.6 |
| 5,375,967 | 12/1994 | Rathert | 414/789.5 |
| 5,480,278 | 1/1996 | Morgan | 414/790.3 |

BULK HANDLING APPARATUS

BACKGROUND OF THE INVENTION

1. Field of the Invention

The present invention relates to an apparatus for automatically loading newspapers into a container device in order to facilitate large-scale movement of newspaper stacks.

2. Art Background

Despite the emergence of computer networks that afford access to vast amounts of information, people still rely heavily on newspapers to provide them with the daily news and other materials. Part of the continuing appeal of newspapers are their relatively low cost to the consumer. The increasing cost of paper to newspaper manufacturers threatens to increase the amount they must charge consumers for newspapers. To attempt to hold down costs, newspaper manufacturers must look for more efficient methods of making and distributing newspapers.

The assembly and stacking of newspapers is one aspect of the manufacturing and distribution process where efficiency could be improved. To distribute newspapers, manufacturers must first stack newspapers to facilitate transportation. Prior art methods of assembling and stacking newspapers entail great expense because, according to these methods, stacks of newspapers must be tied with fasteners such as plastic wrap, sheet wrap, plastic strips or the like.

The material used for these fasteners is expensive, especially in the large quantities in which they are needed for newspapers. Further, the newspapers frequently must have local sections inserted after the newspapers leave the assembly and stacking area, requiring the time consuming and costly step of removing the fasteners before a handler can access the papers within a stack to make the requisite insertions.

The need for fasteners arises due to the inherent instability of newspaper stacks. According to the prior art, a stacking machine ejects newspapers in stacks approximately fourteen inches in height. Groups of stacks are gathered, arranged and dropped a short distance onto a flat surface, known as a pallet, upon which the newspapers will be moved. Prior art pallets do not provide lateral support and the stacks would thus lose their form without the lateral support provided by the fasteners. Further, the gathering and arranging of these stacks often entails lateral movement of the stacks, which would cause the stacks to fall apart without fasteners. Thus, the prior art methods require fasteners. Another problem in prior art newspaper handlers is bottom copy damage resulting from lateral movements. Prior methods alleviate this problem by using bottom sheets. This presents yet another consumable into the process, and adds an element of complexity if the inserts need to be added.

Thus, there is a need for an improved apparatus to handle and process bulk quantities of newspapers whereby stacks of papers need not be fastened together to be loaded onto a bulk holder such as a pallet, and where bottom copy damage is minimized.

SUMMARY OF THE INVENTION

The present invention addresses these aforementioned problems by providing a novel apparatus for stacking and handling stacks of newspapers which does not require that individual stacks be fastened during the assembly and stacking of the newspapers.

According to the present invention, stacks of newspapers are ejected from a stacking device onto a conveyor belt. These stacks are transported via the conveyor to a first assembly station, which comprises two conditioner plates, positioned in parallel on the two sides of the conveyor. Two protruding collector gates extend at the end of the assembly and stop a stack of newspapers from continuing on the conveyor to the next station. Once three stacks have been accumulated in the assembly station, the conditioner plates are powered to squeeze the stacks in order to assure their integrity. The collector gates are then lowered, and the three stacks, called a "slug," are permitted to pass to the next station while travelling in unison.

The slug enters a second assembly station, called the buffer station. The buffer station is physically identical to the first assembly station. However, it is generally inactive, its collector gates are normally not extended. Thus, typically, slugs are permitted to pass through the buffer station unmolested. However, when necessary, this station is activated by extending the collector gates and compressing the slug. For example, the buffer station would be activated when the rate of newspaper ejection from the stacker is too high in relation to the processing capacity of the rest of the apparatus.

After passing the buffer station the slug reaches the end of this conveyor line, and enters the collector. In the collection chamber a pusher plate slides the slug, in a direction perpendicular to its line of travel on the conveyor, onto a movable table which covers a container. The newspapers have been stacked such that the nose of the papers in the bottom half of the stack faces in the direction of lateral movement of the stack within the collection chamber. This minimizes bottom page damage caused by the friction between the paper and the movable table. The papers in the top half of the stack are situated in opposite fashion in order to balance the stack.

The movable table extends from its home position in four successive steps corresponding to the four sets of slugs which arrive on the conveyor to form a layer. After the pusher plate pushes each slug onto the sliding table, it returns to its home position. Once four slugs have been pushed onto the movable table the layer is complete. At this point, the set of twelve stacks (four slugs) is compressed in a four wall chamber consisting of the pusher plate, a compression plate, a fixed wall, and a movable back plate which is attachable to the movable table. The movable table is then returned to its home position, thereby dropping the four slugs a short distance onto a floating board housed within a container which stores multiple layers of stacks.

The floating board is a static board of slightly smaller dimensions than the container in which it is housed. It is automatically lowered responsive to the receipt of a layer of stacks from the movable table above it. A pneumatic device situated below the collection chamber controls the vertical movement of the board. The container is constructed with stand-offs, positioned on an inward extending ledge, at a height that is a few inches above its bottom. Thus, even in rest position, the floating board is elevated above the bottom of the container. This advantageously creates a gap between the floating board and the bottom of the container which allows a fork lift to insert its prongs and elevate the floating board when the container is removed from the collector. Thus, an operator can readily access the newspapers stored within the container.

In operation, the floating board is gradually lowered within the container as successive layers of slugs are stacked on top of it. Initially, when no layers have been stored on the floating board, it is elevated to a height within three inches of the movable table. As each layer is dropped on top of the board, it is sequentially lowered by a distance equal to the height of a stack of newspapers. Thus, the short distance between the movable table and the top of the pallet is maintained constant throughout operation.

Maintaining a short free fall distance is imperative since the stacks are untied. Obviously, as the free fall distance becomes greater, the likelihood of the stacks maintaining their form decreases. Prior art bulk handlers tied each individual stack in order to maintain the integrity of the stacks. The present invention obviates the need to tie or wrap individual stacks by maintaining a short free fall distance, and by taking advantage of the container walls which provide lateral support for the stacks once they are deposited on the floating board.

Once the container is filled it is transported from the collector area to the nester via a conveyor. The container is raised to a sufficient height to enable a second container to be positioned underneath it. Both containers can then be moved simultaneously from the nesting area into a truck.

In another aspect of the invention, the stacks are ejected from the stacker such that the newspapers constituting the bottom half of the stack are automatically configured with the nose end of the fold facing the direction of travel along the movable table. Lateral movements of newspapers can damage the bottom copy of a stack. However, the damaging effects of lateral movements are minimized by positioning the bottom half of each stack of newspapers in such a fashion. Further, the use of a conveyor mat with an extremely low coefficient of friction further minimizes bottom copy damage as the papers are transported from the stacking device to the collector.

BRIEF DESCRIPTION OF THE DRAWINGS

The foregoing and other features and advantages of the present invention will become more apparent to those skilled in the art to which it pertains upon a consideration of the following description taken together with the accompanying drawings in which.

DESCRIPTION OF PREFERRED EMBODIMENT

Figure 1:
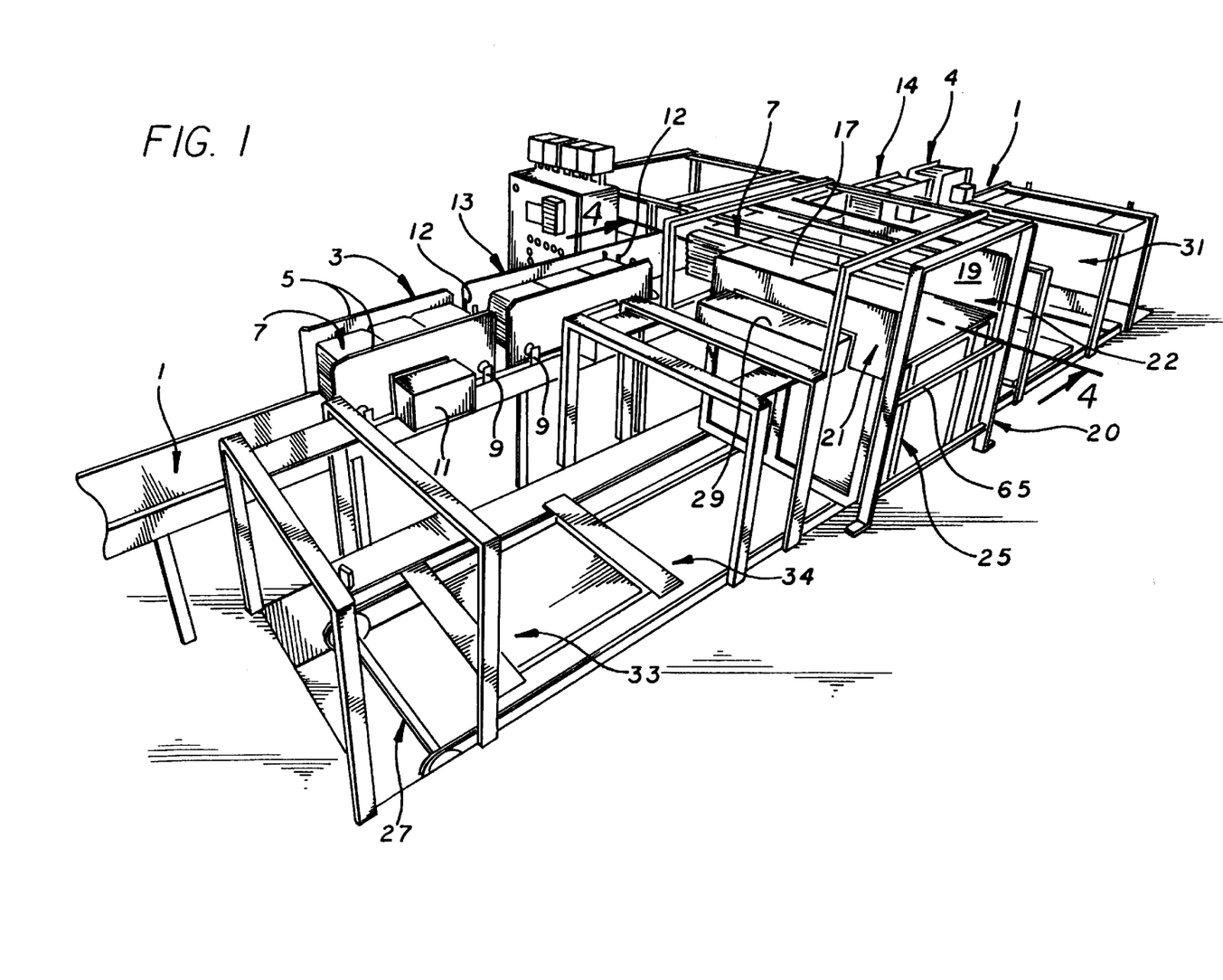
FIG. 1 is an illustration of a bulk handler in accordance with the present invention.

The bulk handling apparatus of the present invention is illustrated in FIG. 1. Newspapers are ejected onto a conveyor belt 1 from a stacking device. These stacks are, according to the preferred embodiment, approximately fourteen inches high. This height is dictated by the capacity of the stacking device, and it is to be understood by those skilled in the art that this invention can readily be applied to taller stacks should future stacking devices permit. According to the preferred embodiment of the present invention, the conveyor belt has a plastic map top which has a very low coefficient of friction in order to minimize bottom copy damage. Presently, plastic tops by Intralox and Rex Corporation are preferred.

Figure 2:
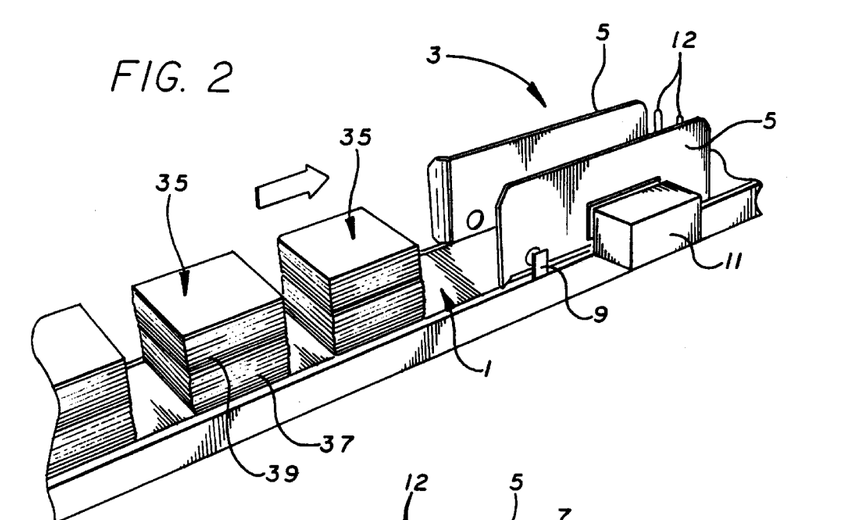
FIG. 2 illustrates three stacks of newspapers entering the assembly station.

Once ejected onto the conveyor 1, the stacks are transported to assembly station 3 which is positioned close to the stacking device to minimize the distance that loose stacks have to travel without lateral support. FIG. 2 depicts three individual stacks of newspapers 35 entering the assembly station 3. Assembly station 3 is comprised of two conditioner plates 5 positioned in parallel along the side of conveyor belt 1, three sensors 9 closely aligned to one of the conditioner plates 5, and two pneumatic drivers 11 coupled to each conditioner plate 5. Collector gates 12 are positioned at the end of the assembly station 3. These gates 12 protrude from the edge of the conveyor belt I and prevent stacks from passing until they are lowered.

As shown in FIG. 2, the stacks 35 are arranged differently on the top and bottom halves. The bottom half 37 is stacked with the nose of the paper facing one direction, and the top half 39 has the nose facing in the opposite direction. This evens the height of the stack since the nose side of a newspaper is slightly higher than the edge side. The bottom half 37 always has the nose facing a certain direction, as will be described later in conjunction with the collection chamber 22, in order to minimize bottom copy damage.

Figure 3:
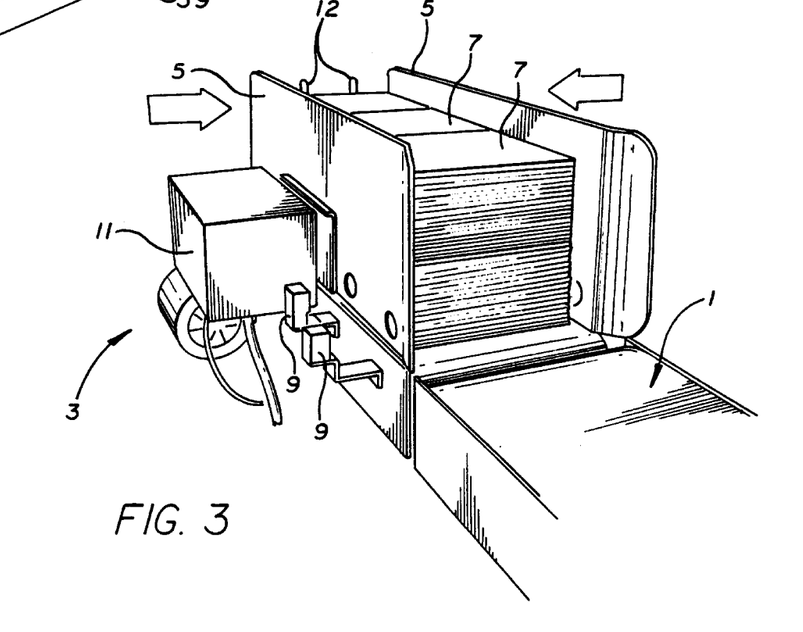
FIG. 3 illustrates the compression of stacks of newspapers within the assembly station.

Stacks that enter the assembly station 3 are stopped by collector gates 12. Once a slug 7 (three stacks) is accumulated in assembly station 3 the sensors 9 detect their presence. The slug 7 is now securely positioned within assembly station 3. As shown in FIG. 3, conditioner plates 5 squeeze the slug, by moving inward just enough to touch the slug 7, in order to enhance the integrity of the stacks. These conditioner plates S are each driven by their own pneumatic drivers 11 which utilize air cylinders to force the conditioner plates 5 inward. Once the slug 7 is squeezed the collector gates 12 are lowered and the slug 7 proceeds into the buffer station 13.

Responsive to signals from the sensors 9 indicating that the slug 7 is present, the conditioner plates 5 are activated to squeeze the slug 7. In the preferred embodiment, three optical sensors are used to detect the presence of the slug 7 within assembly station 3. However, in an alternative embodiment, one sensor may replace the set of three. This one sensor would count the number of stacks that pass. Once three stacks were counted, the single sensor would send signals for conditioner plates 5 to squeeze the slug 7, and after a brief delay, for collector gates 12 to be lowered.

The buffer station 13 is structurally substantially the same as the assembly station 3. In normal operations, however, the slug 7 will pass straight through the buffer station 13 without stopping. The collector gates 12 are thus normally lowered so that they are unobtrusive. However, if the stacking device is ejecting stacks at too high a rate, a buffer may be needed in order for the collector 20 to keep up with the rate at which stacks are being ejected onto conveyor 1. In such a scenario, collector gates 12 will be raised once an appropriate signal is received. Conditioner plates 5 will squeeze the slug 7, and then the slug will finally be permitted to proceed to the collector 20.

As an optional feature of the present invention, as illustrated in FIG. 1, slugs 7 enter the collector 20 from two directions. Conveyor belt 1 extends perpendicularly from the collector 20 on both sides. Thus a second assembly station 4 and a second buffer station 14 are needed to separate a second stacker from the collector 20. The system controls will be programmed, as is well known in the art, to coordinate the timing of slugs 7 on both sides in order to assure that multiple slugs are not received at the collector 20 simultaneously. This alternative embodiment is particularly useful when the processing rate of the collector 20 exceeds the capacity of a single stacking device.

Figure 4:
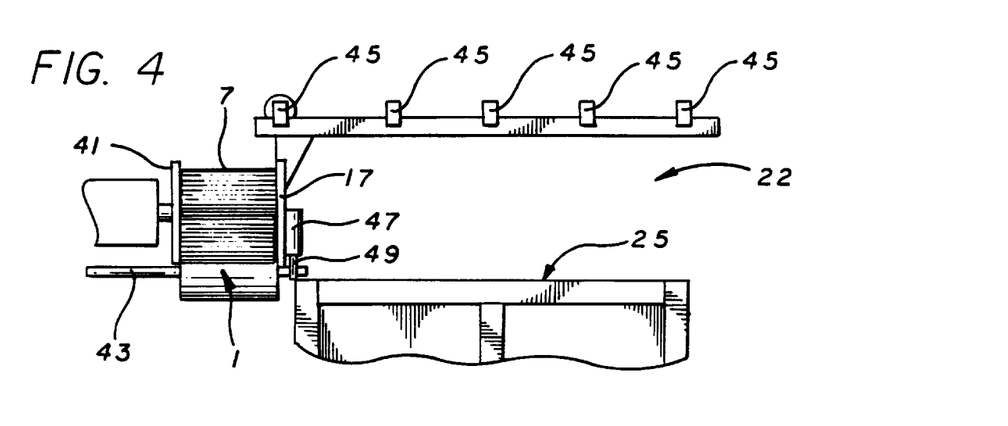
FIGS. 4–7 illustrate the process by which stacks of newspapers are loaded onto the movable table.

Referring to FIGS. 4–8, the collection chamber 22 is illustrated in various stages of operation. As shown in FIGS. 1, and 4, the collector 20 includes a movable back plate 17, a fixed wall 19, a compression plate 21, a container 25, a pusher plate 41, a movable table 43, photo-eye sensors 45, a pneumatic pin driver 47, and pins 49. The pins 49, and the pneumatic pin driver 47 are permanently affixed to moving back plate 17. The collection chamber 22 is comprised of the following: movable back plate 17, fixed wall 19, compression plate 21, and pusher plate 41.

Initially, conveyor 1 positions slug 7 on movable table 43, in between pusher plate 41 and movable back plate 17. Movable table 43 is depicted in FIG. 4 in its "home" position. As more slugs 7 are received, movable table 43 will correspondingly extend outward along with attached movable back plate 17. Movable table 43 is electric motor driven. The photo-eye sensors 45 situated above collection chamber 22 detect the presence of slugs on conveyor I adjacent to pusher plate 41 and within collection chamber 22. These sensors 45 are utilized to control the distance that movable table 43 is to be displaced, and coordinate the extension of pusher plate 41 and displacement of movable table 43.

Insertable pins 49, which are driven by pneumatic driver 47, couple and de-couple movable back plate 17 to movable table 43. In the home position, movable back plate 17 and movable table 43 are coupled. A pneumatic device (not depicted) drives pusher plate 41. Photo-eye sensors 45 align the top portion of the collector 20. These sensors 45 detect the presence of the movable table 43 beneath it. As will be discussed in more detail below, when the movable table 43 reaches its most extended position, illustrated in FIG. 7, sensors 45 cause a signal to be sent to pneumatic pin driver 47 to decouple pin 49 from sliding board 43 thereby decoupling movable back plate 17 from movable table 43.

Figure 5:
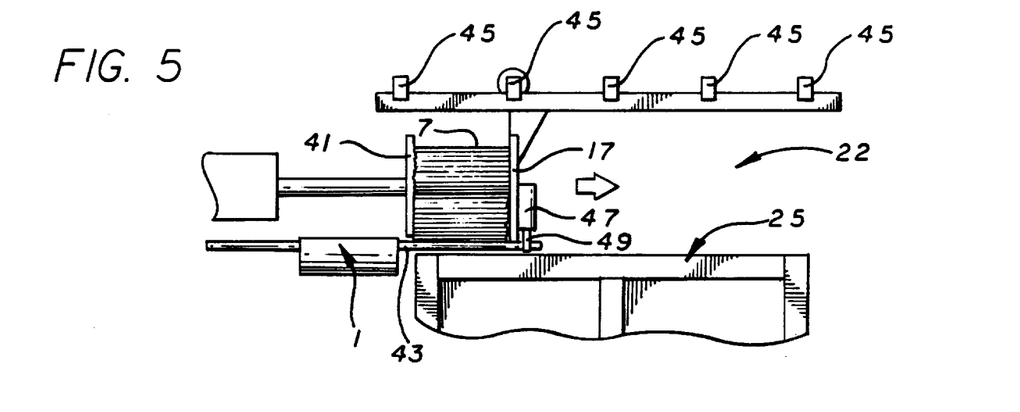

Referring to FIG. 5, pusher plate 41 has laterally moved slug 7 into the collection chamber 22. Movable back plate 17 and pusher plate 41 provide lateral support for the free standing slug 7 to prevent it from toppling over. As discussed earlier, to minimize bottom copy damage, the nose of the bottom half 37 of slug 7 is aligned so that it points in the direction of lateral movement. Thus, the nose points in the same direction that pusher plate 41 moves the slug 7. Further, when movable table 43 is later removed from beneath a complete layer of slugs 7, the table 43 traverses the bottom copies from nose to edge. This is also important in minimizing bottom copy damage.

Figure 6:
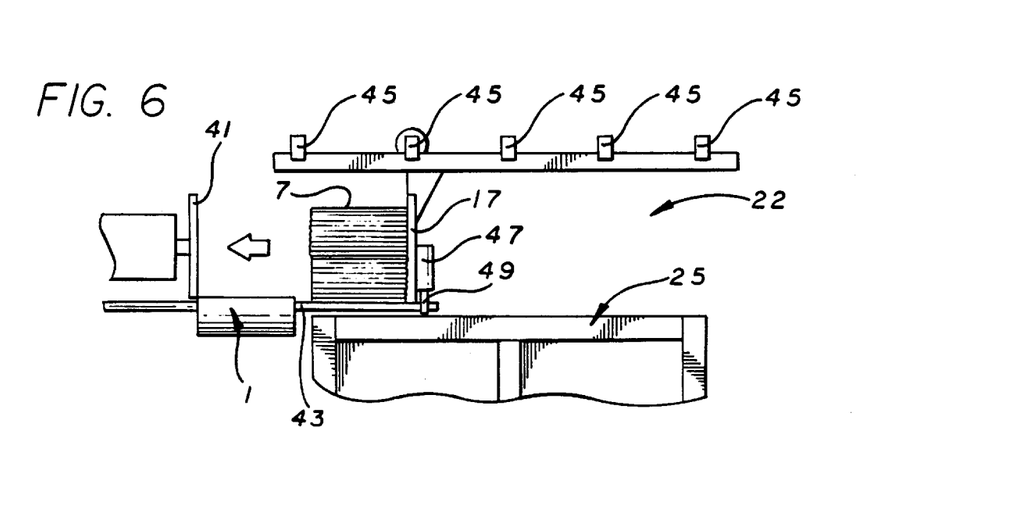
Figure 6A:
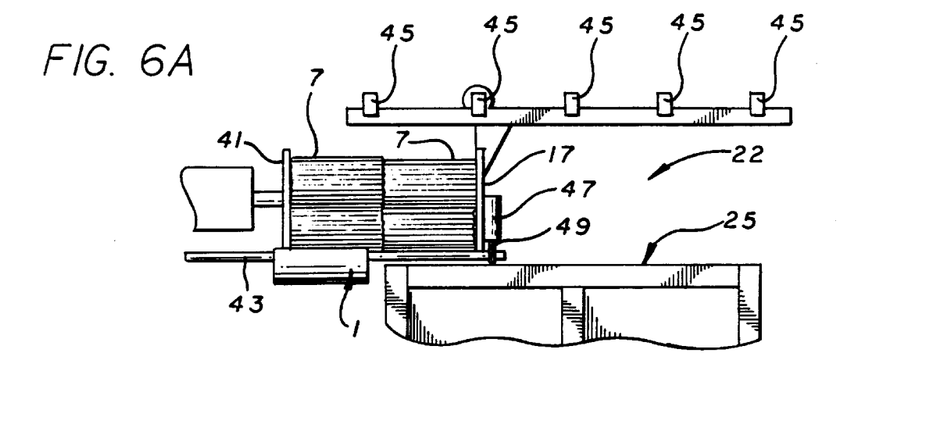
Figure 6B:
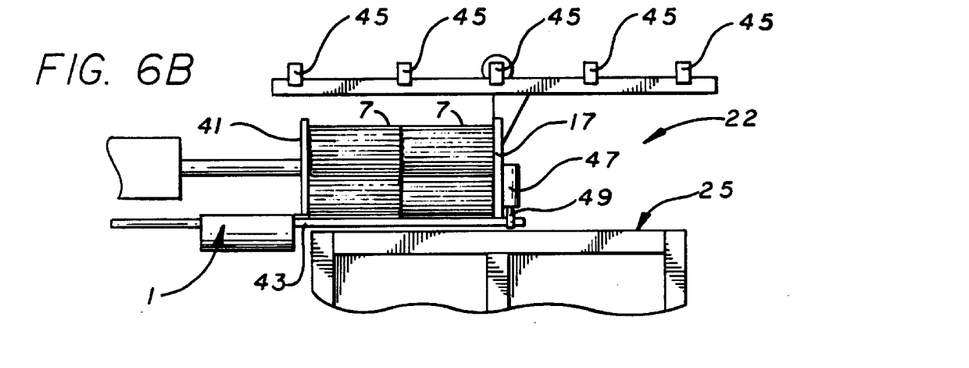

Referring to FIG. 6, movable table 43 has now been extended from the home position by a distance equal to the width of the slug 7. Movable back plate 17 has similarly moved an equal distance. Pusher plate 41 has returned to the home position. Referring to FIG. 6A, as the next slug 7 is pushed into the collection chamber 22 it is laterally secured between pusher plate 41 and the slug which immediately preceded it into the collection chamber 22. Referring to FIG. 6B, the movable back plate 17 and movable table 43 move in conjunction with the pusher plate 41, as it pushes the second slug into the collection chamber 22 adjacent to the first slug. Pusher plate 41 then returns to its home position to push the third slug against the second slug in the collection chamber 22.

Figure 7:
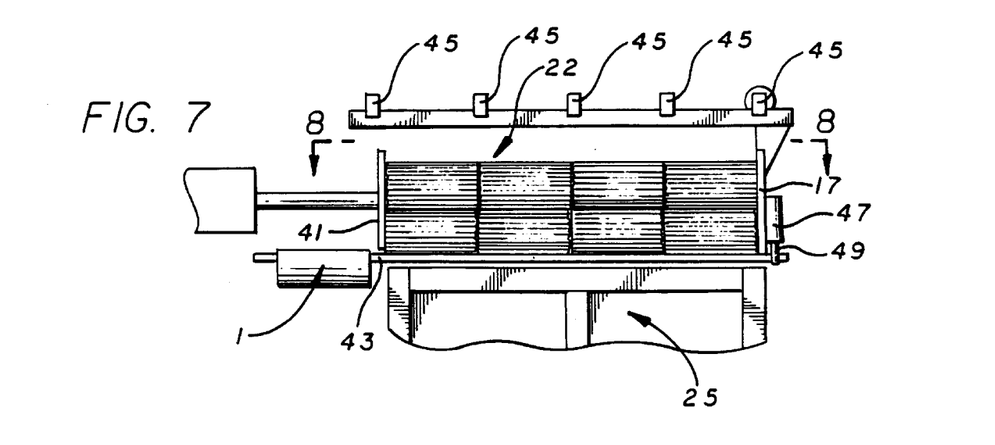
Figure 8:
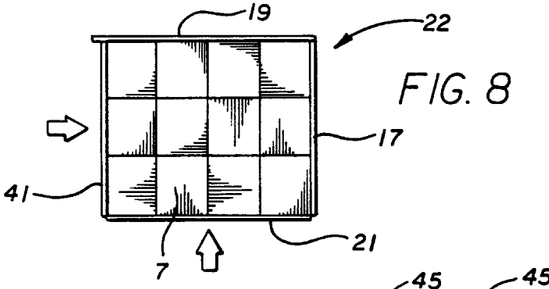
FIG. 8 is a top view of the collection chamber when it is at capacity.

Eventually, a full layer of four slugs 7 will be collected on top of movable table 43. This scenario is depicted in FIG. 7. At this point, pusher plate 41 and compression plate 21 squeeze the four slugs (twelve stacks) against movable back plate 17 and fixed wall 19 in order to further assure the integrity of the stacks. These four walls comprise the collection chamber 22. An overhead view of the full collection chamber 22 is depicted in FIG. 8. This view reveals a four by three matrix of newspaper stacks which comprise a layer in the collection chamber 22.

Figure 9:
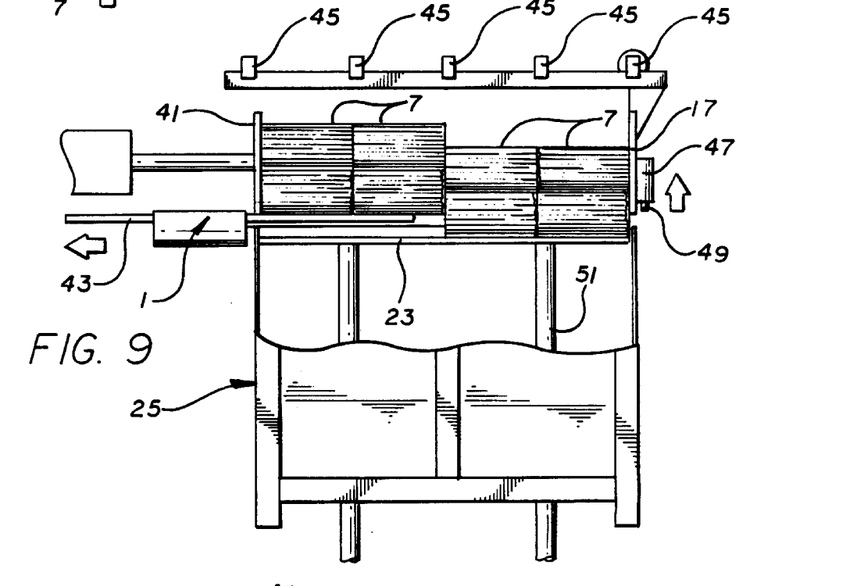
FIG. 9 illustrates the removal of the movable table and its stacks falling onto the floating board below.

Referring to FIG. 9, photo-eye sensors 45 detect that the movable table 43 is fully extended and enable a signal to be sent to pneumatic pin driver 47 to remove pins 49 from movable table 43. Thus movable back plate 17 is decoupled from movable table 43. Movable table 43 returns to its home position. Meanwhile, movable back plate 17 remains in its most extended position from home. As movable table 43 is pulled back to home, the slugs 7 sitting on it sequentially drop onto floating board 23 of container 25.

According to the preferred embodiment, the sensors 45 are of the photo-eye variety. However, an encoder can readily be applied thereby obviating the need for the sensors 45. This encoder would count the number of revolutions of the electric motor (not depicted) driving the movable table 43. Each revolution of the motor corresponds to a discrete lateral movement of movable table 43. Thus, the encoder could calculate, beforehand, the number of revolutions that must occur before the movable table is to be returned to home.

Advantageously, floating board 23 is able to be move vertically within container 25 by the use of four air cylinder lifts 51, shown in FIG. 9. According to the preferred embodiment, floating board 23 is initially raised to a height that is less than three inches below movable table 43. This small distance between floating board 23 and movable table 43 minimizes distortions to the stacks resulting from the free fall onto the floating board 23.

Figure 12:
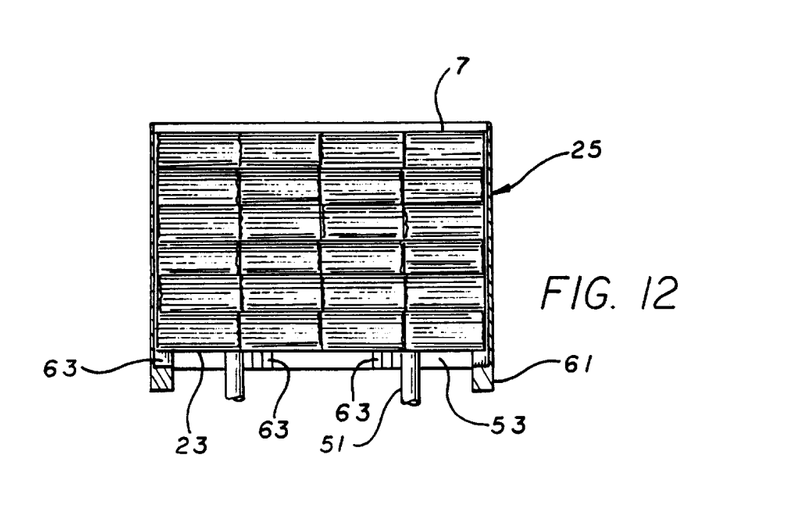
FIG. 12 is a cross-sectional view of the container when it is full.
Figure 14:
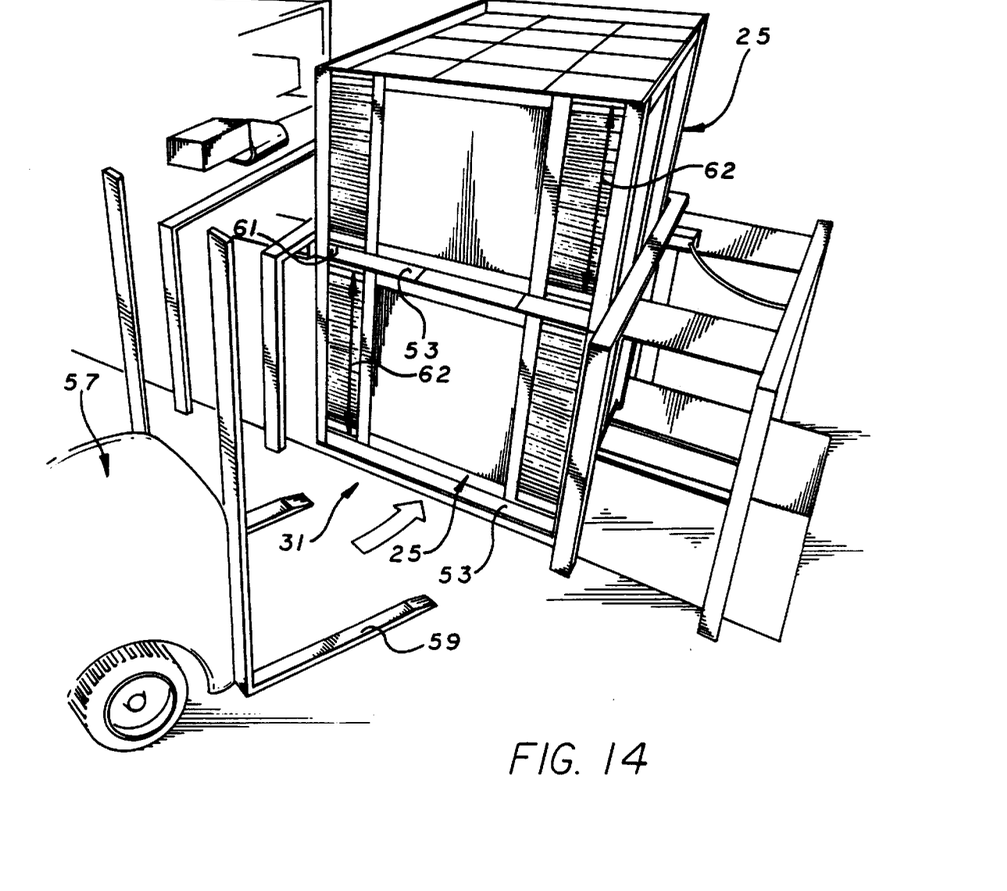
FIG. 14 illustrates how a forklift removes the containers from the nesting device.
Figure 16:
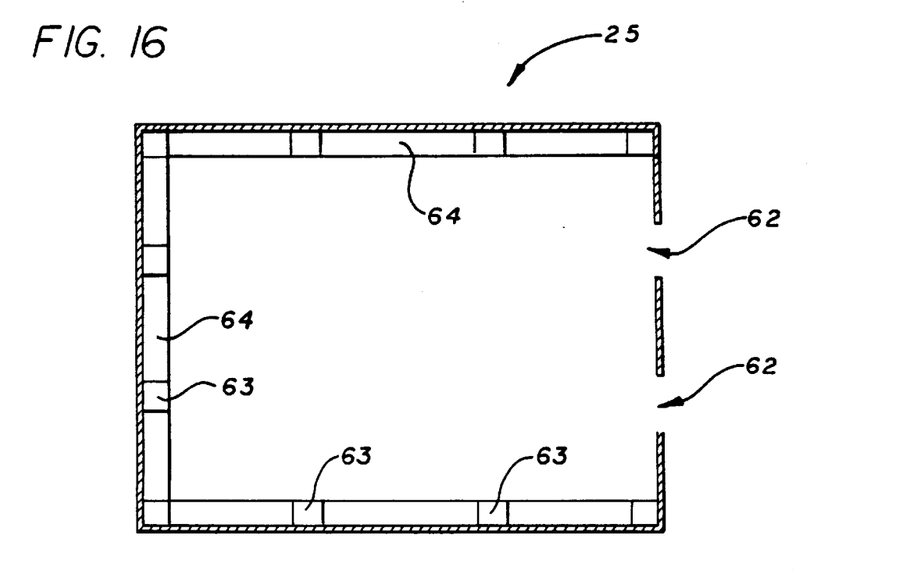
FIG. 16 is an overhead view of the bottom of the container.

Referring to FIGS. 12 and 16, the unique floating board 23 mechanism and the container 25 will now be described in more detail. The container 25 has walls on four sides and a floating board 23 (floor). The floating board 23 is simply a flat board with slightly smaller dimensions than the container 25 in which it is housed. Legs 61 extend from the bottom of the container 25 and lift the container off of the ground to enable the container 25 to be handled by a fork lift. The floating board 23, in its bottom most position, is supported by a plurality of stand-offs 63 which create gap 53 between the floating board 23 and the bottom of container 25. These stand-offs 63 catch and support the floating board 23 when it is in its lowest position. Ledge 64 extends inward from the bottom of container 25 and provides the surface in which stand-offs 63 are situated. Ledge 64 prevents the floating board 23 from falling through the bottom of the container 25 which is open. By raising the floating board 23 above the bottom of container 25, gap 53 is created. Two slots 62 extend from the bottom to the top of container 25. As shown in FIG. 14, these slots 62 enable prongs 59 to be inserted therein in order to raise floating board 23 to access the newspapers stored within container 25.

Figure 13:
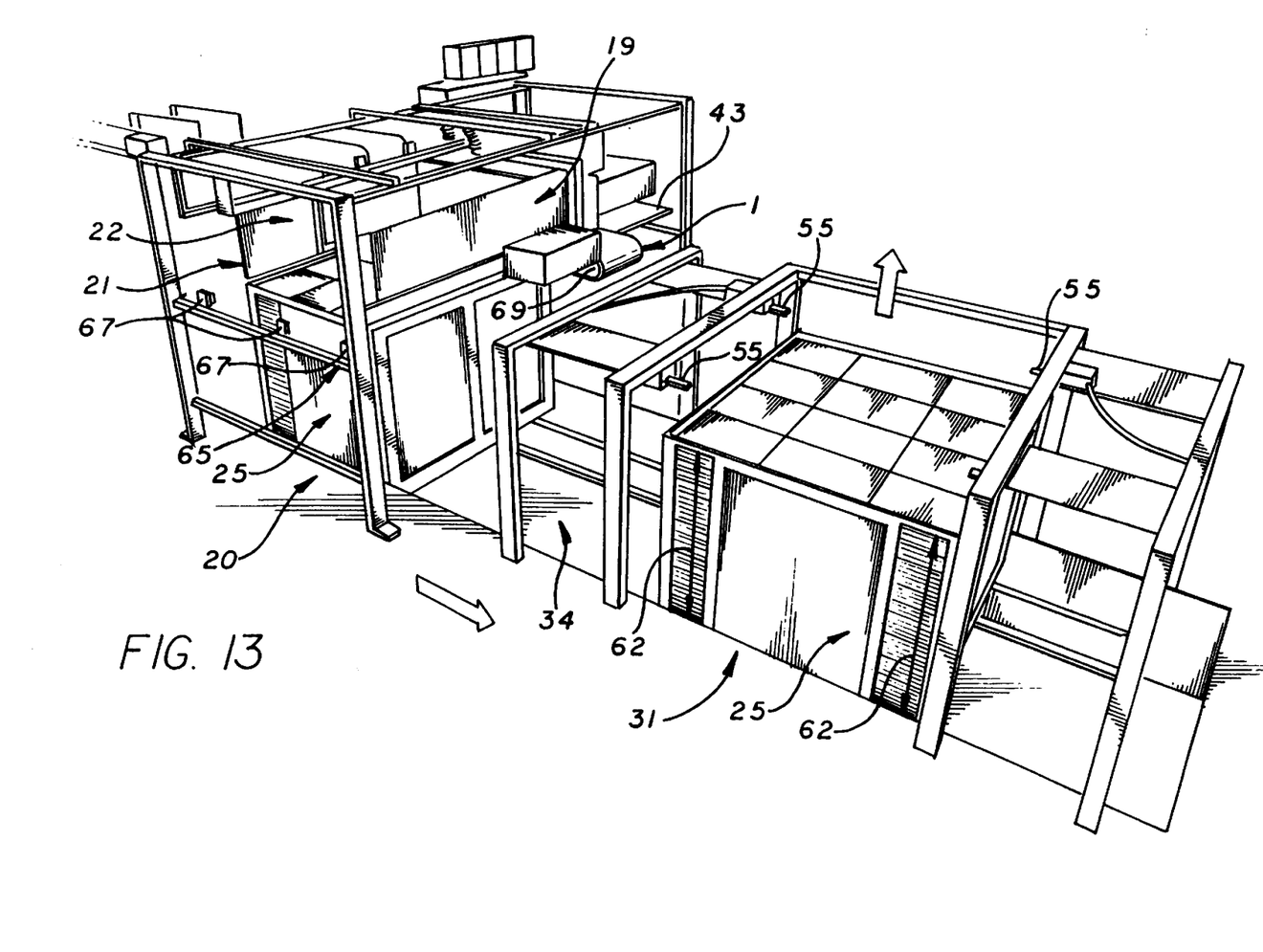
FIG. 13 illustrates the conveyor line connecting the collector to the nesting device.

Referring to FIG. 13, container 25 is shown positioned within collector 20 in a sunken position in pit 34. In a sub-pit (not depicted), four long extendible air cylinders 51 are connected to a flat sub-plate. In FIG. 9 these cylinders 51 are shown extending from an area below the bottom of the container up to a point that is only a few inches below the movable table 43. These pneumatically driven cylinders 51 elevate the sub-plate. This sub-plate is raised so that its top contacts the bottom of floating board 23. In this way, the elevation of the floating board 23 within the container 25 is controlled.

Figure 10:
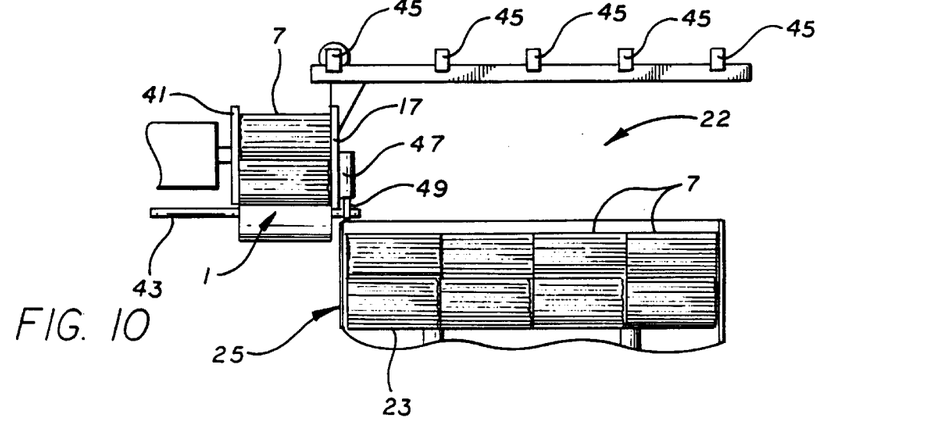
FIG. 10 is a cross-sectional view of the container with one layer of stacks on top of the floating board.

Referring to FIG. 10, once the entire layer of slugs 7 has dropped onto floating board 23, the board 23 is lowered by a distance equal to the height of a slug 7. Lowering floating board 23 by this distance maintains the same short drop (less than three inches) between movable table 43 and the top of the first layer of slugs. Movable back plate 17 is automatically returned to its home position, and the first slug 7 of the second layer is received.

Referring to FIG. 13, three photo-eye sensors 67 positioned on cross-member 65 of collector 20 operate in conjunction with reflectors attached to conveyor side 69 to detect for the appropriate time to lower the floating board 23. The photo-eyes 67 and reflectors are located on the same vertical plane directly opposite to each other. These photo-eyes 67 look across the top portion of container 25 for reflectors which are aligned directly across from them.

When the floating board 23 is in its top most position (three inches below movable table 43) photo-eyes 67 can see the reflectors. However, after the first layer of slugs are dropped onto floating board 23 that view is blocked.

In response, the floating board 23 is lowered until a height is reached in which the photo-eyes 67 can again see the reflectors. This distance is equal to the height of a slug 7 of newspapers. This process repeats itself until the container 25 is filled, at which time that full container is passed along conveyor 27 to nesting station 31, and a new container is placed within collector 20. When the floating board 23 is in its lowest position, the sub-plate and its attached air cylinders are in a sub-pit below pit 34. Thus, the path of the new container into collector 20 is not obstructed.

Figure 11:
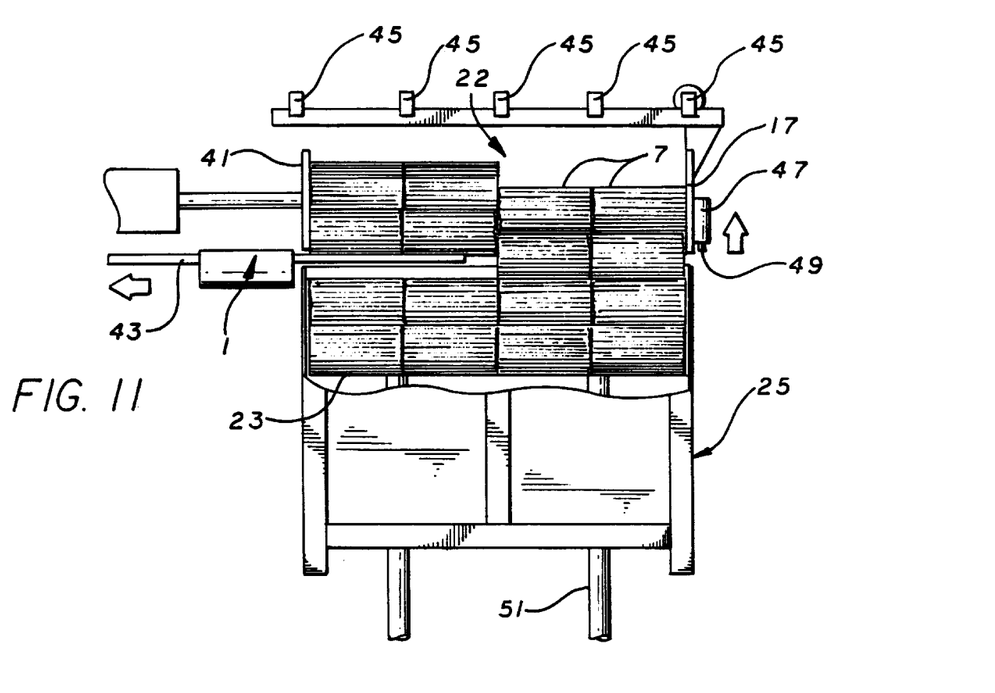
FIG. 11 illustrates the loading of a second layer of stacks on top of a first layer on the floating board.

FIG. 11 depicts the movable table 43 being returned to the home position after a complete layer has been positioned on top of it. As shown, a second layer of slugs drops from the movable table 43 on top of a first layer which is situated within container 25 on floating board 23.

FIG. 12 illustrates a full container 25. At this stage container 25 has been filled with the requisite number of layers of slugs. Floating board 23 has descended to its lowest position. Note that even in this bottom position, there is a gap 53 between floating board 23, and the bottom of the container 25.

Referring to FIG. 1, a second conveyor 27 is housed within subsurface pit 34. The conveyor 27 has three stations associated with it: the de-nesting station 33; collector 20; and the nesting station 31. The pit 34 is necessary in order to enable a container 25 travelling along conveyor 27 from de-nesting station 33 to collector 20 to avoid making contact with compression plate 21.

Referring to FIG. 13, a full container 25 has been transported from the collector 20 to nesting station 31. This station 31 will stack two containers 25 on top of each other. This is accomplished by a hydraulic lift which raises the container 25 to a position above nesting pins 55. In the home position, the nesting pins 55 do not protrude into the path of container 25 as it is lifted. However, once container 25 has been lifted to a sufficient height above nesting pins 55, the pins 55 are activated and are extended inward to support the container 25. Container 25 is then lowered down to a resting position on pins 55.

According to the preferred embodiment these nesting pins 55 are controlled by proximity switches. However, it will readily be appreciated by those skilled in the art that alternative switches and sensors could be substituted without departing from the scope of the invention.

Referring to FIG. 14, a forklift 57 is depicted along with a stack of two filled containers 25 housed within nesting station 31. Legs 61 elevate the bottom of container 25 off of the ground. This enables forklift 57 to insert its prongs 59 beneath the container 25. Forklift 57 can then raise the two filled containers 25 from nesting station 31 and transport them to their next destination.

Figure 15:
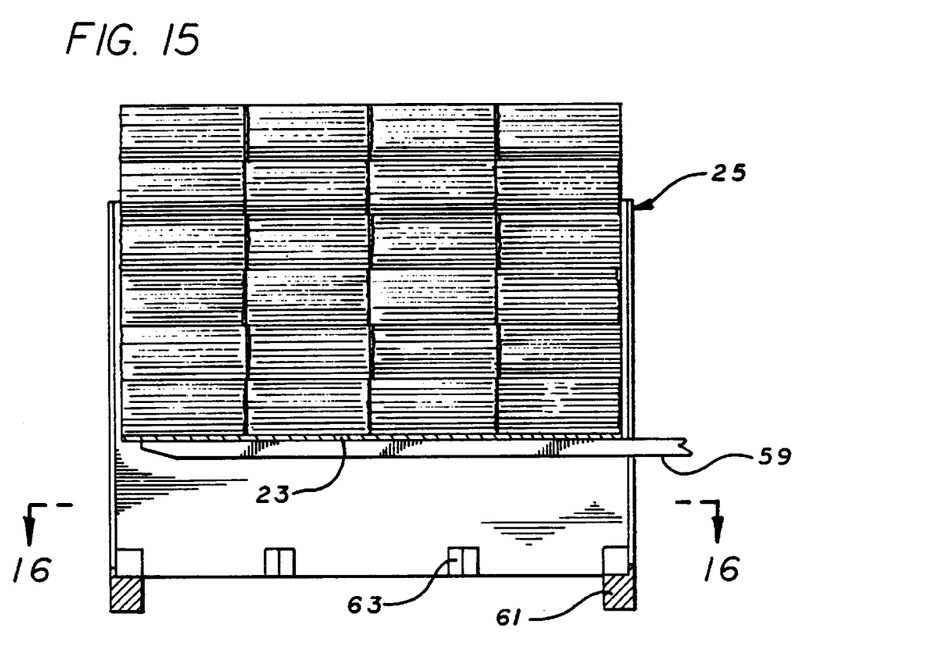
FIG. 15 illustrates a lift raising the floating table to elevate the top level of newspapers above the container top.

Significantly, the floating board 23 within container 25, does not contact the bottom of container 25 thereby creating a gap 53. This gap 53 enables the prongs 59 of forklift 57 to be inserted therein in order to raise the newspapers out of the container 25. Two slots 62 which extend vertically from the bottom to the top of the container 25 provide the prongs 59 with an unobstructed vertical path within the container 25. FIG. 15 is a cross-sectional view of filled container 25 whereby prong 59 is elevating the load to enable access to the top layer of newspapers. A variety of inserts may be added to the newspapers individually. Having the stacks of newspapers untied enhances the efficiency of the insertion process by eliminating the need for consumables which are used to fasten stacks. Once the top layer has been removed, prong 59 will be raised by an amount equal to the height of a slug 7 to enable access to the second layer of newspapers. This process continues until all of the newspapers have been removed from container 25.

As disclosed herein, the present invention provides an improved bulk handling device. Although the present invention has been described with reference to FIGS. 1–16, it will be appreciated that various modifications to the system illustrated in FIGS. 1–16 would not depart from the inventive concepts disclosed herein. For example, the bulk handling apparatus can readily be applied to the stacking of other objects requiring lateral support such as magazines, mail, etc. without significantly modifying the apparatus as disclosed.

The following is claimed:

1. An apparatus for laterally moving one or more sets of stacked articles on a flat surface, each set of stacked articles having at least two opposing sides, comprising:

a first wall perpendicular to said flat surface for providing lateral support on a first side of a set of stacked articles;

a pusher plate perpendicular to said flat surface for engaging a second side of said set of stacked articles and pushing said set onto said flat surface, said first pusher plate providing lateral support on said second side of said set of stacked articles;

an extender for extending said flat surface from a starting position in increments corresponding to the receipt of each set of said stacked articles on said flat surface;

a second wall extending perpendicularly to said flat surface and forming right angles with said first wall and said pusher plate; and a compression plate extending perpendicularly to said flat surface and forming right angles with said first wall and said pusher plate and positioned opposite to said second wall, wherein said pusher plate and said compression plate are used to compress said one or more sets of stacked articles on said flat surface against said first and second walls.

2. The apparatus of claim 1, wherein said increments are approximately equal to the width of a set of said stacked articles.

3. The apparatus of claim 1 wherein said first wall is removably attachable to said flat surface.

4. The apparatus of claim 3, wherein said first wall is attachable to said flat surface by a set of pins which are operable to disengage said first wall from said flat surface when said flat surface is fully extended.

5. The apparatus of claim 4, wherein said flat surface returns to said starting position from its most extended position when said set of pins disengage said first wall from said flat surface thereby causing said one or more sets of stacked articles to fall onto another surface below said flat surface.

6. The apparatus of claim 4, wherein said set of pins are pneumatically driven.

7. An apparatus for laterally moving one or more sets of stacked articles on a flat surface, each set of stacked articles having at least two opposing sides, comprising:
- a wall perpendicular to said flat surface and attachable to said flat surface for providing lateral support on a first side of a set of stacked articles;
- a pusher plate perpendicular to said flat surface for engaging a second side of said set of stacked articles and pushing said set onto said flat surface, said pusher plate providing lateral support on said second side of said set of stacked articles;
- means for extending said flat surface from a starting position in increments corresponding to the receipt of each set of said stacked articles on said flat surface; and
- means for detaching said wall from said flat surface when said flat surface is fully extended from said starting position to allow said flat surface to return to said starting position to cause said one or more sets of stacked articles to fall onto another surface below said flat surface.

8. A method of laterally moving one or more sets of stacked articles on a flat surface, each set of stacked articles having at least two opposing sides, comprising the steps of:
- providing a wall and positioning said wall perpendicular to said flat surface for providing lateral support on a first side of a set of stacked articles;
- providing a pusher plate and positioning said pusher plate perpendicular to said flat surface and engaging a second side of said set of stacked articles;
- using said pusher plate, pushing said set onto said flat surface, said pusher plate providing lateral support on said second side of said set of stacked articles; and
- providing an extender to extend said flat surface from a starting position in increments corresponding to the receipt of each set of said stacked articles on said flat surface; and
- providing removing means to remove said wall from said flat surface when said flat surface is fully extended from said starting position to allow said flat surface to return to said starting position to cause said one or more sets of stacked articles to fall on to another surface below said flat surface.

9. The method of claim 8 wherein said removing means comprises a set of retractable pins for removably attaching said wall to said flat surface.

* * * * *

UNITED STATES PATENT AND TRADEMARK OFFICE
CERTIFICATE OF CORRECTION

PATENT NO.  : 5,769,600

DATED       : June 23, 1998

INVENTOR(S) : Kwasniewski, et al

It is certified that error appears in the above-identified patent and that said Letters Patent is hereby corrected as shown below:

```
Column 4, line 27, after "belt" replace "I" with --1--.
Column 4, line 45, after "plates" replace "S" with --5--.
Column 5, line 35, after "conveyer" replace "I" with --1--.
```

Signed and Sealed this

Second Day of March, 1999

*Attest:*

*Attesting Officer*

Q. TODD DICKINSON

*Acting Commissioner of Patents and Trademarks*